PROPORTION OF MIXTURE OF ZIRCON AND PYROPHYLLITE

PROPORTION OF MIXTURE OF ZIRCON SAND AND ZIRCON FINE POWDER 3,752,682
ZIRCON-PYROPHYLLITE UNFIRED REFRACTORY BRICKS AND METHOD FOR THE MANUFACTURE OF THE SAME
Naoyuki Nameishi, Takasago, and Hajime Yoshino and Shigetoshi Uto, Kakogawa, Japan, assignors to Harima Refractories Co., Ltd., Hyogo-ken, Japan
Filed July 27, 1971, Ser. No. 166,447
Claims priority, application Japan, Sept. 2, 1970, 45/76,324
Int. Cl. C04b 35/16
U.S. Cl. 106—57    14 Claims

ABSTRACT OF THE DISCLOSURE

Disclosed herein is an unfired refractory brick consisting essentially of zircon and pyrophyllite with sodium silicate added as a binder, wherein the grain sizes of said zircon and said pyrophyllite are defined in a predetermined range.

---

This invention relates to an unfired refractory brick consisting essentially of zircon and pyrophyllite and a method for the manufacture of the same.

The zirconium compound to which the invention is directed is zircon, $ZrSiO_4$, a natural mineral substance found in large quantities in the beach sand along the coasts of Australia and Florida, U.S.A. It is known that zircon has good volume stability as well as high refractory properties; hence the zircon refractory has found practical use in the steelmaking industry, such as, for the lining of ladles, nozzles, stopper heads stopper sleeves and the like.

However, in general, zircon refractories have been developed by combining them with one or two other components selected from the group consisting of, for example, quartzite, bauxite, sillimanite, dolomite, and magnesia. While these zircon refractories have an excellent resistance to molten steel and slag, they tend to be penetrated by the molten metal and slag so that the metal tends to stick firmly to the refractory bricks. Hence the above physical disadvantage and an economical problem resulting from its rather high price have resulted in the limited use of this product.

With the recent progress of steelmaking techniques, however, the temperature at which the ladle receives the molten steel has risen with a considerable degree, and further, the molten steel stays in the ladle for a longer period of time than before. Therefore the use of a large quantity of pyrophyllite bricks for use in ladles, no matter how effective for the prevention of metal accretion, and no matter how relatively inexpensive, has heretofore suffered from the disadvantage of exhibiting a relatively short life due to the lower resistance of the pyrophyllite brick to the molten steel and slag compared with that of the other bricks.

Accordingly, the present invention is designed to overcome the above disadvantage of the pyrophyllite refractory, and provides as its object an unfired zircon-pyrophyllite refractory having excellent corrosion resistance at elevated temperatures so as to enhance its resistance to both molten steel and slag, to prevent the molten metal from adhesion, and to prevent penetration of both metal and slag.

It is another object of the invention to provide a method for the manufacture of a novel unfired zirconpyrophyllite refractory brick.

Other objects and advantages of the invention will be apparent from the following description, which, taken in connection with the accompanying drawing, discloses a preferred embodiment thereof.

Referring to the drawings:

FIG. 3 is a top plan view while FIG. 4 is a perspective view thereof.

Figure 1:
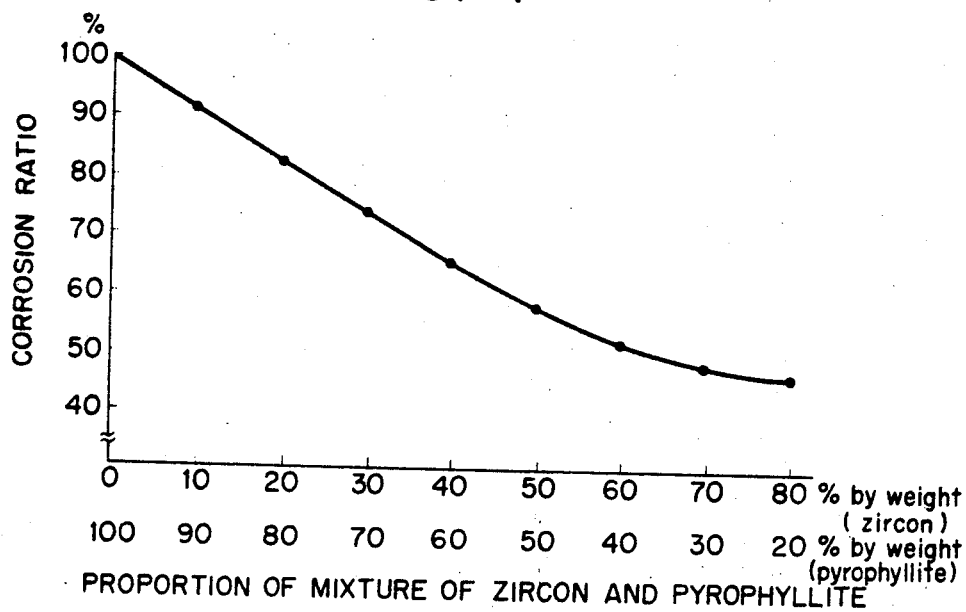
FIG. 1 shows the relation between the proportion of compositions of zircon and pyrophyllite and the corrosion rate thereof.

In this invention, in reference to the particle or grain size of zircon, zircon sand with less than 0.3 mm. and zircon flour of less than 0.15 mm. are employed; the former is obtained in nature, but the latter can be manufactured by subjecting the natural zircon product to pulverizing and screening by means of a fine pulverizing machine to produce a zircon flour with the predetermined particle or grain size.

Two forms or states of the pyrophyllite mineral are employed: the raw mineral and the calcined one calcined at a temperature of about 900°–1000° C. The grain size of the former is 1–4 mm. and less than 1 mm., while the latter is less than 1.5 mm. As is known, the raw pyrophyllite mineral has an inherent problem of distortion because it contains water of crystallization which is lost when exposed to elevated temperatures. Therefore the calcined pyrophyllite is more stable in expansion and contraction than the raw material.

In accordance with a preferred embodiment of the invention, an unfired zircon-pyrophyllite refractory body having superior corrosion resistance is manufactured by a method which comprises the steps of: providing the amount of 100% by weight of the principal material consisting of 15–30% by weight of the naturally occurring zircon sand having a grain size of less than 0.3 mm., 20–40% by weight of comminuted zircon flour having a grain size of less than 0.15 mm., the proportion of zircon sand and zircon flour being adjusted in ther ange of 60:40 to 40:60, 30–35% by weight of raw pyrophyllite having a grain size of 1–4 mm., up to 20% by weight of raw pyrophyllite having a grain size of less than 1 mm., and up to 10% by weight of calcined pyrophyllite having a grain size of less than 1.5 mm., the amount of raw zircon sand, zircon flour, raw and calcined pyrophyllite altogether being 100% by weight; adding as a binder for the above composition up to 3% by weight, maximum, of powdered sodium silicate, or up to 4% by weight, maximum, of aqueous sodium silicate or water glass, or both powdered and aqueous sodium silicate together, and 1–6% by weight of water so as to maintain the content of $Na_2O$ up to 0.8% by weight, the amount of percent by weight of the binders and water being based on the 100% by weight of the composition of the above essential ingredients; mixing and kneading the last-mentioned composition, molding it in a mold with a molding pressure of about 500 kg./cm.² to shape; drying the thus molded shape in the open atmosphere; and then drying it at a temperature between 80° and 100° C. for a period of 24–36 hours.

An especially preferred composition for preparing the unfired zircon-pyrophyllite refractory body consists essentially of 29–15% by weight of zircon sand with grain sizes of less than 0.3 mm., 20–30% by weight of finely divided zircon flour with grain sizes of less than 0.15 mm., 30–35% by weight comminuted raw pyrophyllite with grain sizes ranging from substantially 1 mm. to 4 mm., 20–10% by weight of comminuted raw pyrophyllite with grain sizes of less than 1 mm., and 1–10% by weight of calcined pyrophyllite calcined at a temperature of 900° C. to 1000° C. with grain sizes of less than 1.5 mm., the sum of said zircon sand, said zircon flour, and said raw and calcined pyrophyllite being 100% by weight, and with additional amounts of 0.5–1% by weight of powdered sodium silicate, 3–4% by weight of water glass, and 1–4.5% by weight of water, based on said 100% by weight of said composition, respectively.

An aqueous solution of sodium silicate, called *water glass* is well known, but the powdered sodium silicate referred above is a white crystalline product of Nippon Kagaku Kogyo Co., Ltd., Tokyo, Japan (Japan Chemical Industrial Co., Ltd.), which is manufactured by subjecting the solution of sodium silicate to dehydration. It is dissolved in water to form an aqueous solution of sodium silicate having the desired concentration. The specification of the powdered sodium silicate published by the Japan Chemical Industrial Co., Ltd is as follows:

TABLE 1
[Powdered sodium silicate]

| | Appearance—white powder | | |
|---|---|---|---|
| | No. 1 | No. 2 | No. 3 |
| Molar ratio | 2.05–2.25 | 2.35–2.65 | 3.15–3.35 |
| $SiO_2$, percent | 50–55 | 51–60 | 56–61 |
| $Na_2O$, percent | 23–27 | 21–25 | 17–20 |

The powdered sodium silicate No. 1 shown in Table 1 contains 50–55% by weight of $SiO_2$ and 23–27% by weight of $Na_2O$; hence if more than 3% by weight of sodium silicate powder is added to the refractory composition to be made, it follows that the content of $Na_2O$ of the composition exceeds about 0.8% by weight. In view of the fact that $Na_2O$ tends to be concentrated in the matrix of the refractory to be made, the amount of adding sodium silicate powder should not exceed 3% by weight. In the case where sodium silicate powder is added in an amount of more than 3% by weight based on the 100% by weight of the composition, it has been found that the manufacture of a refractory body of this invention is feasible with no addition of water glass at all.

The aqueous solution of sodium silicate (water glass) is specified in JIS (Japanese Industrial Standard) K1408 wherein three kinds, Nos. 1–3, are listed as follows:

TABLE 2
[Liquid sodium silicate in JIS K1408]

| | Appearance—viscous liquid | | |
|---|---|---|---|
| | No. 1 | No. 2 | No. 3 |
| $SiO_2$, percent | 35–38 | 34–36 | 28–30 |
| $Na_2O$, percent | 17–19 | 14–15 | 9–10 |

It is understood that the aqueous solution of sodium silicate, the liquid sodium silicate, and the water glass refer to the same substance, so the term "water glass" will be hereinafter used to refer to all three materials.

The water glass employed in this invention is No. 2 above. When the other kinds of water glass are used, it is seen that either $Na_2O$ or water should be added in view of their respective quantities. For example, in case water glass No. 3 is adopted, it is seen that $Na_2O$ decreases while water increases and viscosity decreases. Therefore in the use of water glass No. 3, the amount of No. 3 to be added should be determined based on the required quantity in connection with the amount of water contained in the plastic refractory mix. It has been found that the lack of viscosity should be compensated by the addition of powdered sodium silicate.

The present inventors have discovered that the addition of pyrophyllite to the mixture of zircon sand and zircon flour prevents the metal adherence, an inherent defect of zircon refractory, and further, restricts the occurrence of lamination due to the original particle size of the zircon sand being as large as 0.3 mm. during the molding step, so that the manufacture of a relatively large size of refractory brick is feasible.

In nature zircon itself can't be found having a particle size big enough for use in an aggregate. Hence, in order to prevent lamination during the molding step, it is very common to mold the zircon material with a synthetic aggregate obtained from zircon, or to mold it under a low molding pressure. This process, however, results in a more complicated one, whereby the refractory body of high porosity, the cause for the penetration of molten steel and slag to a considerable degree, is produced.

A refractory brick manufactured from the composition of zircon added with pyrophyllite has a somewhat lower resistance to corrosion than that of the refractory made of zirconalone. In order to play a role as an aggregate for the refractory composition, at least 30% by weight pyrophyllite with a grain size of 1–4 mm. should be added. It is seen that the corrosion resistance decreases according as the content of pyrophyllite increases, as shown in FIG. 1. When the addition of pyrophyllite amounts to about 65% by weight of the composition, the zircon refractory containing the same amount exhibits about 70% of the corrosion of the conventional pyrophyllite brick. It is shown that the addition of more than 65% by weight of pyrophyllite to the zircon refractory composition lowers not only its corrosion resistance, but also the expense involved in using quantities of zircon.

From Table 3 wherein the comparison of corrosion rates according to various grain or particle sizes of raw pyrophyllite between the samples A, B and C is shown, it is clearly indicated that the larger the maximum grain size of the raw pyrophyllite, the less the amount of corrosion; and if the grain size is too large, it is seen that cracking will take place owing to the difference of expansion and shrinkage around the grains in the region of the service temperature. It is seen that the grain size of raw pyrophyllite as an aggregate is preferably about 4 mm., and the amount of pyrophyllite added as an aggregate is preferably 30–35% by weight.

It has been found that the presence of more than 35% by weight of the pyrophyllite aggregate decreases its apparent porosity but increases its gas permeability, and its corrosion resistance is thus lowered. Further, if it is less than 30% by weight, the aggregate is deficient, which results in bringing about lamination during molding.

TABLE 3
[Corrosion rate according to variation of grain size of raw pyrophyllite]

| | Percent by weight | | |
|---|---|---|---|
| Sample | A | B | C |
| Raw pyrophyllite, 1–4 mm | 30 | | |
| Raw pyrophyllite, 1–2 mm | | 30 | |
| Raw pyrophyllite, less than 1 mm | 10 | 10 | 40 |
| Calcined pyrophyllite, less than 1.5 mm | 10 | 10 | 10 |
| Zircon sand, less than 0.3 mm | 20 | 20 | 20 |
| Zircon flour, less than 0.15 mm | 30 | 30 | 30 |
| Sodium silicate powder No. 1 | (1) | (1) | (1) |
| Water glass, No. 2 | (3.5) | (3.5) | (3.5) |
| Corrosion rate, percent | 100 | 110 | 125 |

NOTE 1.—The numeral in ( ) refers to percent by weight based on the 100% by weight of the composition.
NOTE 2.—The more the corrosion rate the more the corrosion.

Figure 2:
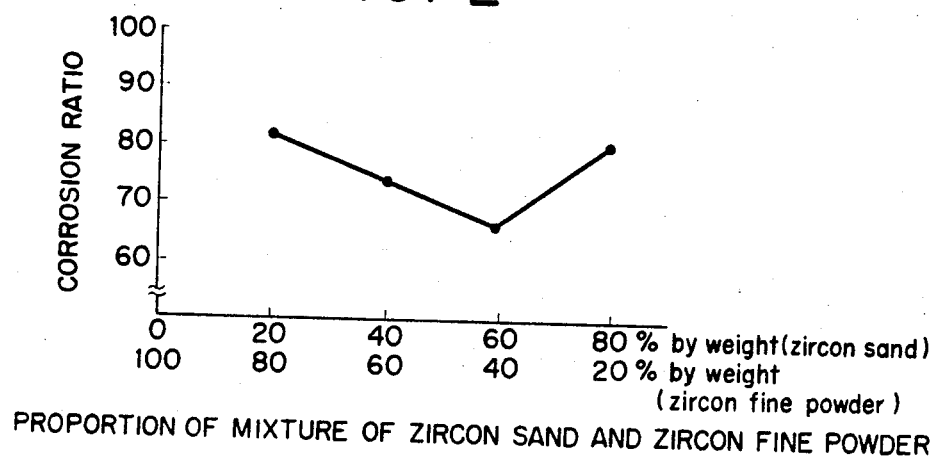
FIG. 2 shows the relation between the proportion of distribution of zircon sand and zircon fine powder flour and the corrosion rate thereof.

With respect to the proportions of zircon sand and zircon flour, it is found that the more the flour the better the corrosion resistance. If the quantity of zircon flour, however, is too great, it bring about lamination. Accordingly, as shown in FIG. 2, the ratio of zircon sand to zircon flour is preferred to be in the range of 60:40 to 40:60. In addittion, the use of some calcined pyrophyllite free from the water of crystallization is desirable for the purpose of preventing both lamination during molding and cracking during drying. If too much raw pyrophyllite is added, it is difficult for the refractory brick to attain a high density despite a high pressure molding step, because of several factors, e.g., the slip, hardness, and hygroscopic property of the raw pyrophyllite particles, and the deaeration of the refractory mix. In the calcined pyrophyllite, on the other hand, the slip of the calcined pyrophyllite particles is bad, but it increases hardness as well as hygroscopic property due to the elimination of the properties of the raw pyrophyllite. Therefore, the addition of calcined pyrophyllite to the refractory composition results in the avoidance of lamination due to a good deaeration, or the migration of air and moisture through the plastic mix during molding. On the other hand, it is seen that porosity increases in proportion as the content of calcined pyrophyllite increases. As the pyrophyllite expands somewhat in the temperature range of calcination, 700°–1050° C., to increase its porosity, the amount of added calcined pyrophyllite should be restricted to within 10% by weight. Moreover, a relatively large particle size of calcined pyrophyllite should not be employed because the calcined pyrophyllite itself has a higher apparent porosity.

Hence it is advantageous to add the calcined pyrophyllite in the form of a fine powder so as to have it dispersed in the matrix of the refractory body, thus obviating the occurrence of lamination. However, in view of the comminuting efficiency, the maximum particle size of calcined pyrophyllite is preferably 1.5 mm.

As described hereinbefore, the aqueous solution of sodium silicate as well as the powered sodium silicate made by the Japan Chemical Industrial Co., Ltd., is a suitable binder for the refractory of this invention. In reference to the corrosion resistance of a refractory containing the above binder, it is seen that the less the amount of water glass and sodium silicate powder added the more corrosion resistance is achieved. The minimum quantity of the binder is required to attain the green strength as well as the predetermined degree of sintering for the manufacture of the refractory body in view.

The upper limit of the amount of water glass to be added is 4% by weight based on the 100% by weight composition in order to obtain an amount of water suitable for molding a refractory shape. If water glass is added in excess of 4% by weight, an excess of water follows, which leads to lamination during moulding. It has been found, however, that the green strength of the refractory composition containing 4% by weight water glass is deficient. Hence it is desirable to add powdered sodium silicate to make up for this deficient strength. It is understood, however, that 1–6% weight water based on the 100% by weight composition should be added in addition to the water content of the water glass.

Table 4 shows the distribution of particle sizes of zircon sand and zircon flour.

TABLE 4
[Distribution of particle size of zircon sand and zircon flour]

| Particle size, mm | 0.295–0.208 | 0.208–0.147 | 0.147–0.104 | 0.104–0.074 | 0.074–0.053 | Less than 0.053 |
|---|---|---|---|---|---|---|
| Zircon sand, percent | 58.9 | 20.5 | 17.6 | 2.5 | 0.5 | |
| Zircon flour, percent | | | 4.8 | 17.6 | 21.4 | 56.2 |

Table 5 shows the distribution of particle size of raw pyrophyllite, 1–4 mm.

TABLE 5
[Distribution of particle size of raw pyrophyllite, 1–4 mm.]

| Raw pyrophyllite, particle size, mm | 1–2 | 2–3 | 3–4 |
|---|---|---|---|
| Distribution, percent | 53.3 | 30.0 | 16.7 |

The present invention will be described in connnection with Examples 1–5:

EXAMPLE 1

Percent by weight
Zircon sand, less than 0.3 mm. _____ 29–30
Zircon flour, less than 0.15 mm. _____ 36–40
Raw pyrophyllite, 1–4 mm. _____ 35–30

Powdered sodium silicate No. 1 _____ 0.5–2.5
Water glass, No. 2 _____ 0.5–3.5
Water _____ 1–5.5

The sum of the three ingredients listed above the line shall be 100% by weight, and percent by weight of each of the ingredients listed below the line shall be based on the 100% by weight composition. All ingredients are mixed and kneaded, placed in a mold, molded with a molding pressure of about 500 kg./cm.$^2$ to shape, then dried in the open atmosphere and finally dried under heat at a temperature of 80°–100° C. for a period of 24–36 hours to obtain the product of this invention. The manufacturing steps are the same in Examples 1–5, and are therefore not set forth in Examples 2–5.

EXAMPLE 2

Percent by weight
Zircon sand, less than 0.3 mm. _____ 29–30
Zircon flour, less than 0.15 mm. _____ 35–30
Raw pyrophyllite, 1–4 mm. _____ 35–30
Raw pyrophyllite, up to 1 mm. _____ 1–10

Powdered sodium silicate No. 1 _____ 2–3
Water glass No. 2 _____ 1–2
Water _____ 2–5.5

EXAMPLE 3

Percent by weight
Zircon sand, less than 0.3 mm. _____ 20–15
Zircon flour, less than 0.15 mm. _____ 20–24
Raw pyrophyllite, 1–4 mm. _____ 30–35
Raw pyrophyllite, less than 1 mm. _____ 20–18
Calcined pyrophyllite, less than 1.5 mm. _____ 10–8

Water glass No. 2 _____ 3–4
Powdered sodium silica te No. 1 _____ 0.5–1
Water _____ 1–4.5

EXAMPLE 4

Percent by weight
Zircon sand, less than 0.3 mm. _____ 18–22
Zircon flour, less than 0.15 mm. _____ 24–20
Raw pyrophyllite, 1–4 mm. _____ 33–35
Raw pyrophyllite, up to 1 mm. _____ 15–18
Calcined pyrophyllite, less than 1.5 mm. _____ 10–5

Powdered sodium silicate, No. 1 _____ 0.5–1
Water glass, No. 2 _____ 3–4
Water _____ 1–4.5

EXAMPLE 5

Percent by weight
Zircon sand, less than 0.3 mm. _____ 20–29
Zircon flour, less than 0.15 mm. _____ 30–20
Raw pyrophyllite, 1–4 mm. _____ 33–31
Raw pyrophyllite, less than 1 mm. _____ 15–10
Calcined pyrophyllite, less than 1.5 mm. _____ 2–10

Powdered sodium silicate No. 1 _____ 0.5–1
Water glass No. 2 _____ 3–4
Water _____ 1–4.5

Table 6 shows the chemical analysis of principal ingredients employed in Examples 1–5.

TABLE 6
[Chemical analysis of principal ingredients of Examples 1-5]

| | Ignition loss | $SiO_2$ | $TiO_2$ | $Al_2O_3$ | $Fe_2O_3$ | $ZrO_2$ | $Na_2O$ | $K_2O$ | Total, percent |
|---|---|---|---|---|---|---|---|---|---|
| Zircon sand | 0.03 | 32.80 | 0.08 | 0.02 | 0.07 | 66.90 | | | 99.90 |
| Zircon flour | 0.12 | 32.42 | 0.10 | 0.71 | 0.20 | 66.42 | | | 99.98 |
| Raw pyrophyllite | 3.30 | 77.00 | 0.16 | 17.64 | 0.60 | | 0.25 | 0.50 | 99.45 |
| Calcined pyrophyllite | 0.28 | 80.02 | 0.31 | 17.40 | 1.17 | | 0.12 | 0.49 | 99.79 |

The physical properties of the products of the Examples 1-5 are shown in Table 7 together with those of the conventional pyrophyllite refractory brick.

TABLE 7
[Physical properties of products of Ex. 1-5 and of conventional pyrophyllite brick]

| | Product of this invention | | | | | Pyrophyllite brick of prior art |
|---|---|---|---|---|---|---|
| Example Number | 1 | 2 | 3 | 4 | 5 | |
| Apparent specific gravity | 3.74 | 3.59 | 3.09 | 3.20 | 3.30 | 2.56 |
| Bulk density | 3.12 | 3.11 | 2.71 | 2.79 | 2.91 | 2.19 |
| Apparent porosity, percent | 16.4 | 13.4 | 12.3 | 12.6 | 11.9 | 14.5 |
| Compressive strength, kg./cm.² | 678 | 851 | 376 | 430 | 404 | 250 |
| Refractoriness, SK | 29 | 28 | 26 | 27 | 27 | 27 |
| Softening point under load at high temperatures, °C., 2 kg./cm.²: | | | | | | |
| $T_1$ | 1,335 | 1,325 | 1,170 | 1,195 | 1,210 | 1,152 |
| $T_2$ | 1,440 | 1,370 | 1,275 | 1,300 | 1,305 | 1,270 |
| $T_3$ | 1,490 | 1,440 | 1,435 | 1,410 | 1,405 | 1,440 |
| Corrosion rate, percent | 49 | 55 | 69 | 69 | 57 | 100 |

NOTE.—The less the corrosion rate the better for the refractory.

EXAMPLE 6

There are some kinds of zircon sand which contain a lot of impurities among the recently imported ones as shown in Table 8.

TABLE 8
[Chemical analysis of principal ingredients of Example 6]

| | Ignition loss | $SiO_2$ | $TiO_2$ | $Al_2O_3$ | $Fe_2O_3$ | $ZrO_2$ | $Na_2O$ | $K_2O$ | Total, percent |
|---|---|---|---|---|---|---|---|---|---|
| Zircon sand | 0.03 | 30.73 | 2.05 | 2.53 | 0.52 | 63.14 | | | 99.00 |
| Zircon flour | 0.09 | 30.24 | 2.45 | 2.91 | 0.80 | 63.03 | | | 99.52 |
| Raw pyrophyllite | 3.02 | 77.70 | 0.28 | 17.76 | 0.60 | | 0.24 | 0.45 | 100.05 |
| Calcined Pyrophyllite | 0.10 | 82.92 | 0.33 | 16.25 | 0.34 | | 0.15 | 0.32 | 99.51 |

| | Percent by weight |
|---|---|
| Zircon sand, less than 0.3 mm. | 30 |
| Zircon flour, less than 0.15 mm. | 20 |
| Raw pyrophyllite, 1-4 mm. | 30 |
| Raw pyrophyllite, less than 1 mm. | 10 |
| Calcined pyrophyllite, less than 1.5 mm. | 10 |
| Powdered sodium silicate No. 1 | 1 |
| Water glass No. 2 | 3.5 |
| Water | 2 |

The above ingredients with specified percentages by weight, respectively, are mixed and kneaded, molded into a refractory shape, dried in the open atmosphere for the period of 24 hours, and finally dried at a temperature of 80°–100° C. in a known drying oven for the period of 20 hours. The physical properties of the product of Example 6 are shown in Table 9.

TABLE 9
[Physical properties of the product of Example 6, and those of conventional pyrophyllite brick]

| | Product of Ex. 6 | Conventional pyrophyllite brick |
|---|---|---|
| Apparent specific gravity | 3.28 | 2.55 |
| Bulk density | 2.90 | 2.18 |
| Apparent porosity, percent | 11.6 | 14.5 |
| Compressive strength, kg./cm.² | 420 | 245 |
| Refractoriness, SK | 27 | 27 |
| Softening point under load at high temperatures, °C., 2 kg./cm.²: | | |
| $T_1$ | 1,230 | 1,245 |
| $T_2$ | 1,315 | 1,360 |
| $T_3$ | 1,420 | 1,430 |
| Corrosion rate, percent | 63 | 100 |

Figure 3:
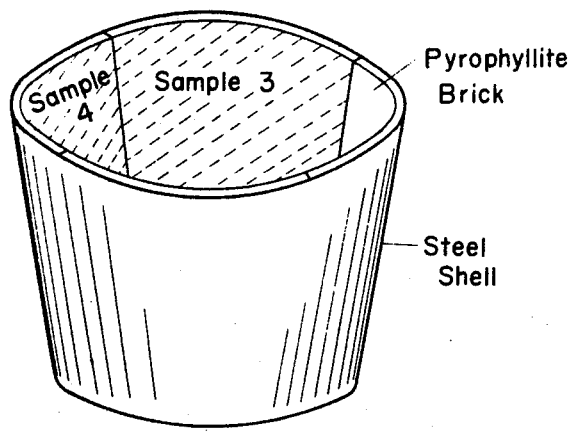
FIGS. 3-4 show how each of the refractories of the invention is arranged for the lining of the ladle for testing
Figure 4:
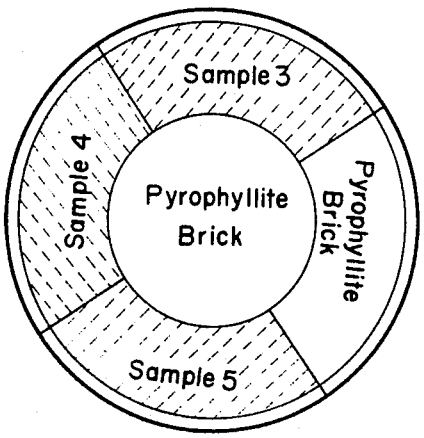

FIGS. 3-4 show a ladle lined with the refractory bricks of this invention side by side with the conventional pyrophyllite ones into which the molten steel is poured, and a corrosion test was conducted by the use of the ladle. Table 10 shows the test results of refractory linings made of the bricks of the invention and of the conventional pyrophyllite ones in the same ladle in connection with the products of Examples 1-5 wherein the molten steel was poured for testing. It is clear from the results of Table 10 that the unfired zircon-pyrophyllite refractory brick made in accordance with the principle of this invention is excellent, and it has been found that neither molten steel nor slag penetrates into the brick. From an economical point of view, the unfired zircon-pyrophyllite refractory of this invention has been found to be satisfactory.

TABLE 10
[Test results of refractory linings made of the bricks of the invention and of the pyrophyllite ones]

| Actual test number | 1 | 2 | 3 |
|---|---|---|---|
| Capacity of test ladle, ton | 170 | 170 | 190 |
| Service life of ladle (No. of charge) | 33 | 34 | 24 |
| Corrosion rate mm./charge: | | | |
| Example 1 | 2.5 | 2.0 | 3.8 |
| Example 2 | 2.8 | 2.3 | 4.1 |
| Example 5 | 2.9 | 2.3 | 4.3 |
| Pyrophyllite brick of prior art | 5.9 | 5.5 | 7.9 |

With respect to the test results of the product of Example 6 containing a relatively low content of $ZrO_2$ together with a high content of $TiO_2$ as well as $Al_2O_3$, they are shown in Table 11. Table 11 indicates that the unfired zircon-pyrophyllite refractory brick is a satisfactory one which is resistant to the penetration of molten steel and slag.

TABLE 11
[Test results of refractory linings made of the bricks of Example 6 and of the pyrophyllite ones]

| | |
|---|---|
| Capacity of test ladle, ton | 170 |
| Service life of ladle (No. of charge) | 32 |
| Corrosion rate, mm./charge: | |
| Brick of Example 6 | 3.8 |
| Pyrophyllite brick of prior art | 6.0 |

With reference to the softening point under load at high temperatures described in Tables 7 and 9, it is specified in JIS (Japanese Industrial Standard) R2209 as follows: when the sample 50 mm. φ x 50 mm. height of the refractory brick is subjected to the load, 2 kg./cm.² while heating at the rate of 6° C. per minute, the temperature at which it is beginning to soften shall be $T_1$, the temperature at which the initial height of the sample has been compressed to 2% be $T_2$, and the temperature at which it has been compressed to 20% be $T_3$.

It is understood that the invention is not limited to the specific embodiments described, but departures may be made therefrom within the scope of the accompanying claims without departing from the principles of the invention and without sacrificing its chief advantages.

Having thus described our invention, what we claim is:

1. A composition adapted to form a lining for a steel ladle and the like, said composition consisting essentially of 29–30% by weight zircon sand with grain sizes less than 0.3 mm., 36–40% by weight finely divided zircon flour with grain sizes less than 0.15 mm., and 35–30% by weight comminuted raw pyrophyllite with grain sizes ranging from substantially 1 mm. to 4 mm., the sum of said zircon sand, said zircon flour, and said raw pyrophyllite being 100% by weight, and with additional amounts of 0.5–2.5% by weight powdered sodium silicate, 0.5–3.5% by weight water glass, and 1–5.5% by weight water, based on said 100% by weight said composition, respectively.

2. A composition adapted to form a lining for a steel ladle and the like, said composition consisting essentially of 29–30% by weight zircon sand with grain sizes less than 0.3 mm., 35–30% by weight finely divided zircon flour with grain sizes less than 0.15 mm., 35–30% by weight comminuted raw pyrophyllite with grain sizes ranging from substantially 1 mm. to 4 mm., and 1–10% by weight comminuted raw pyrophyllite with grain sizes less than 1 mm., the sum of said zircon sand, said zircon flour, and said comminuted raw pyrophyllite being 100% by weight, and with additional amounts of 2–3% by weight powdered sodium silicate, 1–2% by weight water glass, and 2–5.5% by weight water, based on said 100% by weight of said composition, respectively.

3. A composition adapted to form a lining for a steel ladle and the like, said composition consisting essentially of 29–15% by weight zircon sand with grain sizes less than 0.3 mm., 20–30% by weight finely divided zircon flour with grain sizes less than 0.15 mm., 30–35% by weight comminuted raw pyrophyllite with grain sizes ranging from substantially 1 mm. to 4 mm., 20–10% by weight comminuted raw pyrophyllite with grain sizes less than 1 mm., and 1–10% by weight calcined pyrophyllite calcined at a temperature of 900° to 1000° C. with grain sizes less than 1.5 mm., the sum of said zircon sand, said zircon flour, and said raw and calcined pyrophyllite being 100% by weight, and with additional amounts of 0.5–1% by weight powdered sodium silicate, 3–4% by weight water glass, and 1–4.5 percent by weight water, based on said 100% by weight of said composition, respectively.

4. The composition of claim 1 wherein said powdered sodium silicate is manufactured by subjecting liquid sodium silicate or water glass to dehydration.

5. The composition of claim 2 wherein said powdered sodium silicate is manufactured by subjecting liquid sodium silicate or water glass to dehydration.

6. The composition of claim 3 wherein said powdered sodium silicate is manufactured by subjecting liquid sodium silicate or water glass to dehydration.

7. The composition of claim 1 wherein the addition of both the water glass and powdered sodium silicate is so controlled that said composition contains up to 0.8% by weight of sodium oxide, $Na_2O$.

8. The composition of claim 2 wherein the addition of both the water glass and powdered sodium silicate is so controlled that said composition contains up to 0.8% by weight of sodium oxide, $Na_2O$.

9. The composition of claim 3 wherein the addition of both the water glass and powdered sodium silicate is so controlled that said composition contains up to 0.8% by weight of sodium oxide, $Na_2O$.

10. The composition of claim 1 wherein the composition contains zircon having a grain size of 0.15 to 0.3 mm. and zircon having a grain size of up to 0.15 mm. in such proportions that the ratio of the former to the latter is in the range of 60:40 to 40:60.

11. The composition of claim 2 wherein the composition contains zircon having a grain size of 0.15 to 0.3 mm. and zircon having a grain size of up to 0.15 mm. in such proportions that the ratio of the former to the latter is in the range of 60:40 to 40:60.

12. The composition of claim 3 wherein the composition contains zircon having a grain size of 0.15 to 0.3 mm. and zircon having a grain size of up to 0.15 mm. in such proportions that the ratio of the former to the latter is in the range of 60:40 to 40:60.

13. A method for the manufacture of an unfired refractory composition adapted to form a lining for a steel ladle and the like comprising the steps of providing a composition consisting essentially of 29–30% by weight of zircon sand with grain sizes of less than 0.3 mm., 36–40% by weight of finely divided zircon flour with grain sizes of less than 0.15 mm. and 30–35% by weight of comminuted raw pyrophyllite with grain sizes ranging from substantially 1 mm. to 4 mm., the sum of said zircon sand, said zircon flour and said raw pyrophyllite being 100% by weight, adding as a binder 0.5–2.5% by weight of powdered sodium silicate, 0.5–3.5% by weight of water glass and 1–5.5% by weight of water, based on said 100% by weight of said composition, respectively, controlling the content of sodium oxide to be up to 0.8% by weight in the thus-obtained mixture, kneading said mixture, molding said mixture in a mold with the pressure of about 500 kg./cm.² into shape, drying said shape in the open atmosphere, and again drying said shape at a temperature of from 80° C. to 100° C. for a period of 24 to 36 hours to obtain the finished product.

14. A method for the manufacture of an unfired refractory composition adapted to form a lining for a steel ladle and the like comprising the steps of providing a composition consisting essentially of 29–15% by weight of zircon sand with grain sizes of less than 0.3 mm., 20–30% by weight of finely divided zircon flour with grain sizes of less than 0.15 mm., 30–35% by weight of comminuted raw pyrophyllite with grain sizes ranging from substantially 1 mm. to 4 mm., 20–10% by weight of comminuted raw pyrophyllite with grain sizes of less than 1 mm., and 1–10% by weight of calcined pyrophyllite calcined at a temperature of 900° C. to 1000° C. with grain sizes of less than 1.5 mm., the sum of said zircon sand, said zircon flour, and said raw and calcined pyrophyllite being 100% by weight, adding as a binder 3–4% by weight of water glass and 1–4.5% by weight of water, based on said 100% by weight of said composition, respectively, controlling the content of sodium oxide to be up to 0.8% by weight in the thus-obtained mixture, kneading said mixture, molding said mixture in a mold with the pressure of about 500 kg./cm.² into shape, drying said shape in the open atmosphere, and again drying said shape at a temperature of from 80° C. to 100° C. for a period of 24 to 36 hours to obtain the finished product.

References Cited
UNITED STATES PATENTS

| | | | |
|---|---|---|---|
| 1,440,766 | 1/1923 | Buckman et al. | 106—57 |
| 2,567,088 | 9/1951 | Teasel | 106—57 |
| 2,633,623 | 4/1953 | Robinson | 106—57 |
| 2,675,323 | 4/1954 | Busby et al. | 106—57 |
| 2,771,376 | 11/1956 | Capellman | 106—57 |
| 3,321,321 | 5/1967 | Abrecht et al. | 106—65 |
| 3,359,124 | 12/1967 | Henry | 106—57 |

JAMES E. POER, Primary Examiner

U.S. Cl. X.R.

106—67, 84